(12) United States Patent
Shimizu et al.

(10) Patent No.: US 12,228,751 B2
(45) Date of Patent: Feb. 18, 2025

(54) LENS BARREL

(71) Applicant: NIKON CORPORATION, Tokyo (JP)

(72) Inventors: Kunihiko Shimizu, Tokyo (JP); Mizuki Wayu, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 1035 days.

(21) Appl. No.: 17/256,493

(22) PCT Filed: Jun. 4, 2019

(86) PCT No.: PCT/JP2019/022174
§ 371 (c)(1),
(2) Date: Dec. 28, 2020

(87) PCT Pub. No.: WO2020/003922
PCT Pub. Date: Jan. 2, 2020

(65) Prior Publication Data
US 2021/0278571 A1    Sep. 9, 2021

(30) Foreign Application Priority Data
Jun. 28, 2018 (JP) .................. 2018-123658

(51) Int. Cl.
*G02B 7/02* (2021.01)
*G02B 5/00* (2006.01)

(52) U.S. Cl.
CPC .............. *G02B 5/005* (2013.01); *G02B 7/02* (2013.01)

(58) Field of Classification Search
CPC .......... G02B 5/005; G02B 7/02; G02B 7/102; G02B 5/00; G02B 7/04; G02B 7/08; G03B 9/06
See application file for complete search history.

(56) References Cited

U.S. PATENT DOCUMENTS

| 4,258,996 A | 3/1981 | Uesugi et al. |
| 2010/0165488 A1 | 7/2010 | Ishimasa |
| 2011/0181967 A1* | 7/2011 | Wakamizu ............. G03B 17/04 359/817 |
| 2015/0192784 A1* | 7/2015 | Fujinaka .............. G02B 27/646 359/557 |

(Continued)

FOREIGN PATENT DOCUMENTS

| CN | 101866041 A | 10/2010 |
| JP | S53-123933 U | 10/1978 |

(Continued)

OTHER PUBLICATIONS

Feb. 14, 2022 Office Action issued in Chinese Patent Application No. 201980042392.9.

(Continued)

*Primary Examiner* — Balram T Parbadia
(74) *Attorney, Agent, or Firm* — Oliff PLC (57) ABSTRACT

The present invention provides a lens barrel capable of changing the aperture diameter according to a zoom position while having a short length. A lens barrel 1 according to the present invention comprises: a aperture unit 20 having a cam follower 21*a*; and a moving tube 7 having a cam groove 7*b* for engaging the cam follower 21*a*, the moving tube being provided at the outer circumference of the aperture unit 20 and able to move along the optical axis direction.

14 Claims, 9 Drawing Sheets

(56) References Cited

U.S. PATENT DOCUMENTS

2017/0153412 A1    6/2017  Ohmori

FOREIGN PATENT DOCUMENTS

| JP | S53-145843 U | 11/1978 |
| JP | S57-054120 U | 3/1982 |
| JP | S58-091435 A | 5/1983 |
| JP | S61-095325 A | 5/1986 |
| JP | 2001-290190 A | 10/2001 |
| JP | 2012-008335 A | 1/2012 |
| JP | 2017-097243 A | 6/2017 |

OTHER PUBLICATIONS

Sep. 10, 2019 Search Report issued in International Patent Application No. PCT/JP2019/022174.

* cited by examiner

LENS BARREL

TECHNICAL FIELD

The present invention relates to a lens barrel.

BACKGROUND ART

In a certain type of conventional lens barrel, the aperture diameter is variable by zooming.

Such a lens barrel includes a fixed tube having a cam groove for adjustment of the aperture diameter.
(See, for example, Patent Document 1)
Patent Document 1: Japanese Unexamined Patent Application, Publication No. 2001-290190

DISCLOSURE OF THE INVENTION

The present invention is directed to a lens barrel including: an aperture unit having a cam follower; and a moving tube having a cam groove that engages the cam follower, the moving tube being provided on an outer circumference of the aperture unit and being movable in an optical axis direction.

BRIEF DESCRIPTION OF THE DRAWINGS

FIGS. 7A and 7B are diagrams illustrating the second unit moving tube 7, in which

PREFERRED MODE FOR CARRYING OUT THE INVENTION

Description of Whole System

Figure 1:
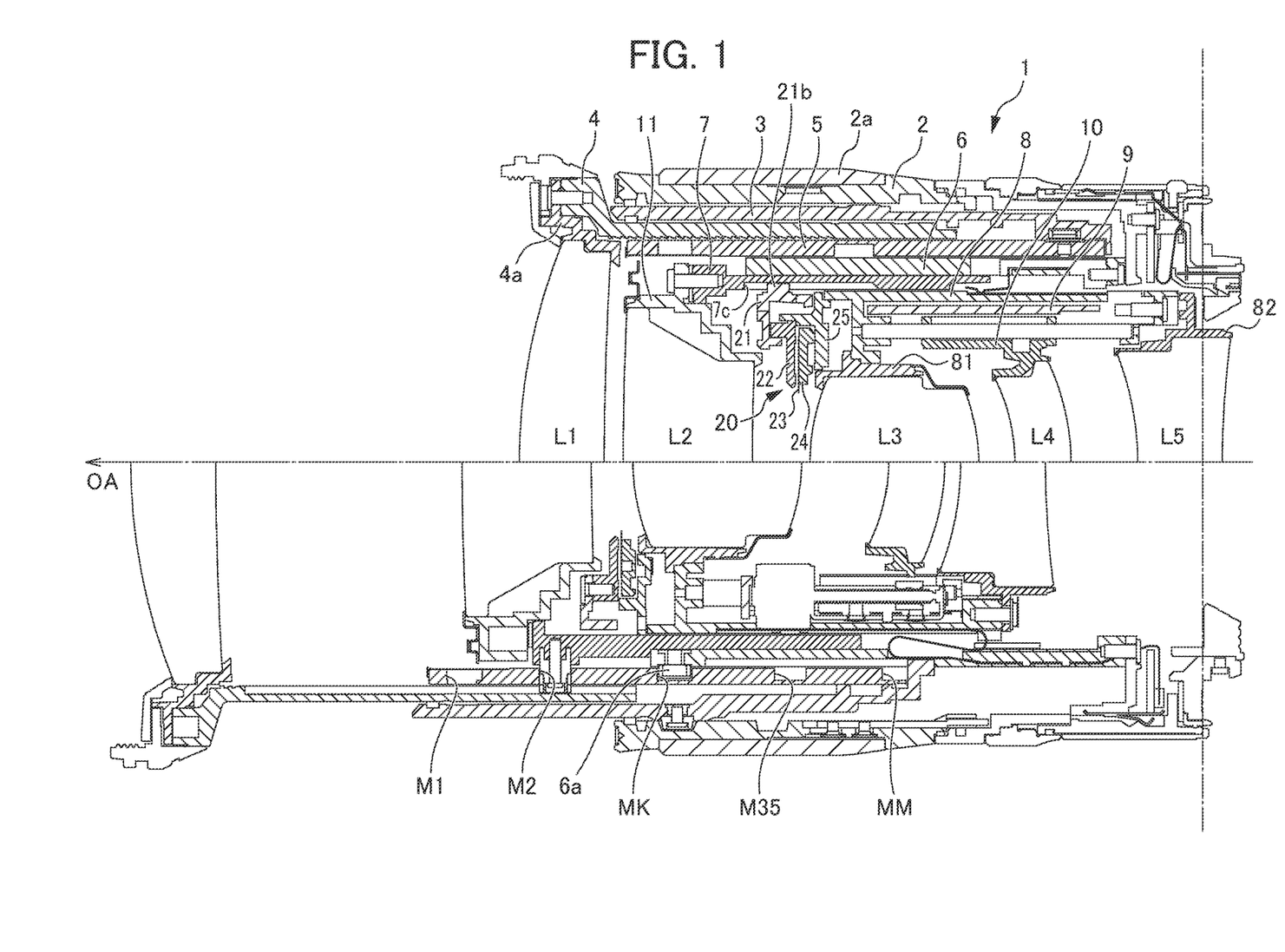
FIG. 1 is a cross-sectional view of a lens barrel 1 according to an embodiment of the present invention.

FIG. 1 is a cross-sectional view of a lens barrel 1 according to an embodiment of the present invention. In the drawing, the left side in the optical axis OA direction is the object side (front side or plus side), and the right side in the optical axis OA direction is the body side (rear side or minus side). The lens barrel 1 has a range of imaging from telephoto to wide angle, and has a contracted state (also called a housed state or a collapsed state). The lens barrel 1 is an interchangeable lens system that is attachable to and detachable from a camera body (not shown). The upper part of FIG. 1 shows a contracted state in which the lens barrel 1 is contracted to the minimum length, and the lower part shows a telephoto state in which the lens barrel 1 is extended to the maximum length.

The lens barrel 1 includes a first lens unit L1, a second lens unit L2, a third lens unit L3, a fourth lens unit L4, and a fifth lens unit L5. The fourth lens unit L4 is a focusing lens unit.

The lens barrel 1 includes, from the outer circumferential side (outer diameter side), a zoom ring 2, a rectilinear tube 3, a first unit moving tube 4, a cam tube 5, a fixed tube 6, a second unit moving tube 7, a third-fifth unit moving tube 8, and a motor moving tube 9.

Figure 2:
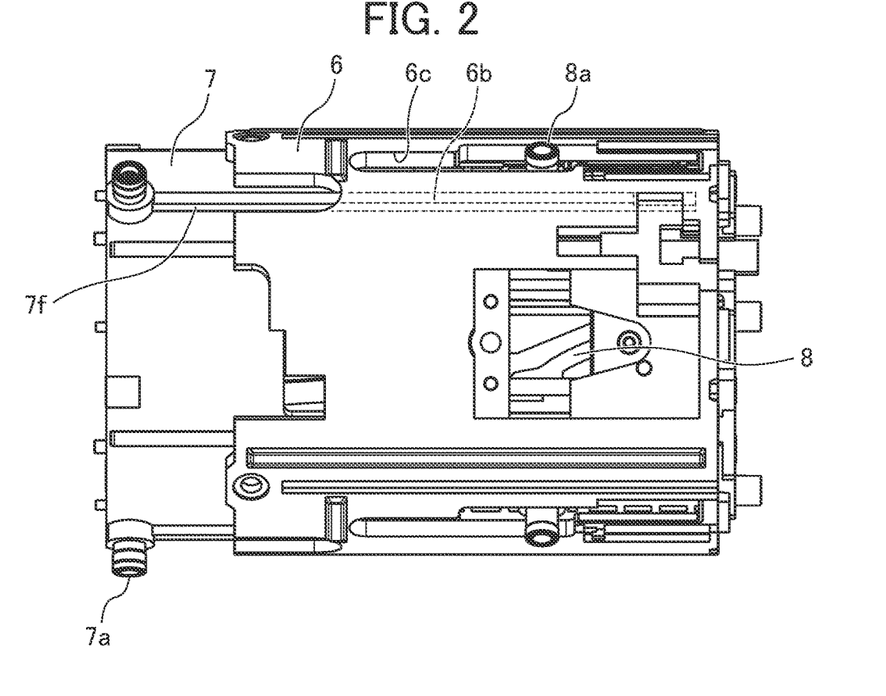
FIG. 2 is a view showing the positional relationship in a wide angle state between a second unit moving tube 7, a fixed tube 6, and a third-fifth unit moving tube 8.
Figure 3:
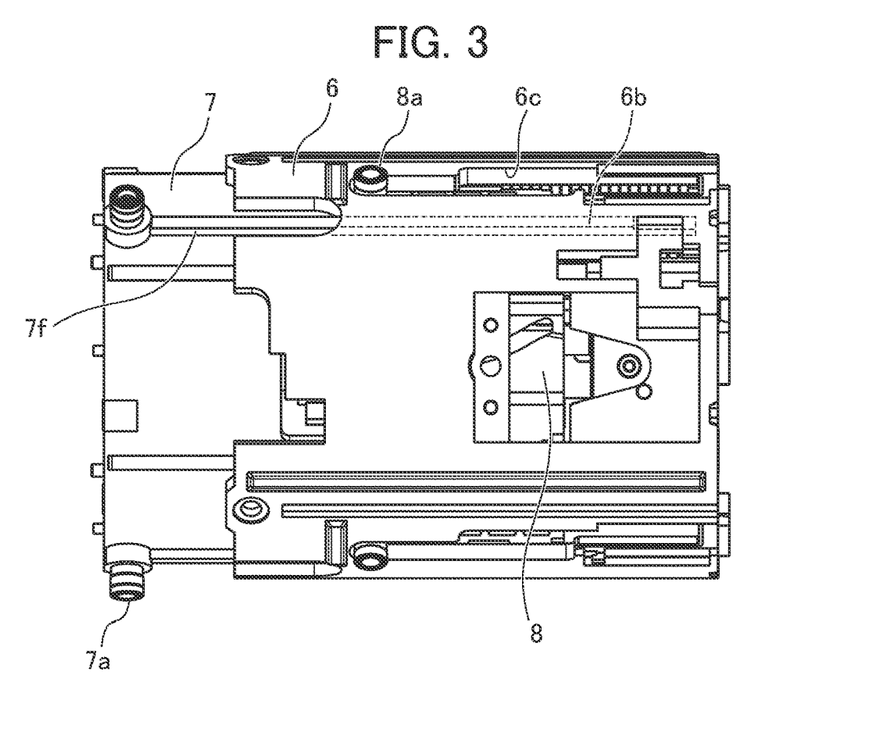
FIG. 3 is a view showing the positional relationship in a telephoto state between the second unit moving tube 7, the fixed tube 6, and the third-fifth unit moving tube 8.
Figure 4:
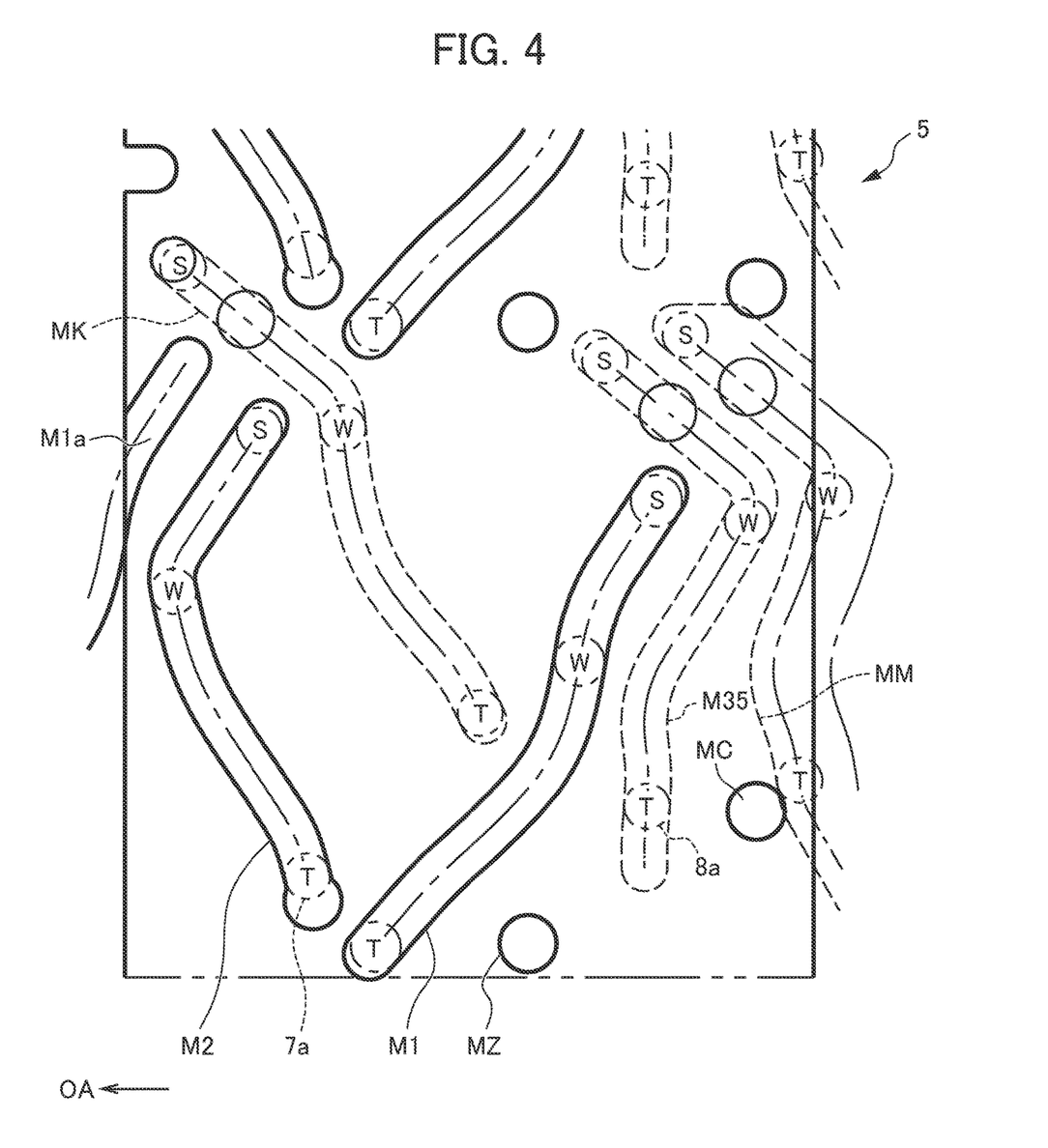
FIG. 4 is a developed view of a cam tube 5.

FIG. 2 is a view showing the positional relationship in a wide angle state between the second unit moving tube 7, the fixed tube 6, and the third-fifth unit moving tube 8. FIG. 3 is a view showing the positional relationship in a telephoto state between the second unit moving tube 7, the fixed tube 6, and the third-fifth unit moving tube 8. FIG. 4 is an exploded view of the cam tube 5.

As shown in FIG. 1, the zoom ring 2 is provided with a rubber ring 2a on its outer circumference. The photographer performs zooming by rotating the zoom ring 2.

The fixed tube 6 is fixed with respect to the mount.

The cam tube 5 is provided with a zoom interlocking pin MZ and a rectilinear tube connecting pin MC (see FIG. 4). The zoom interlocking pin MZ engages a rectilinear groove on the inner circumference (inner diameter side) of the zoom ring 2. The rectilinear tube connecting pin MC engages a circumferential groove on the inner circumference of the rectilinear tube 3. The cam tube 5 has a cam groove MK that engages a cam follower 6a of the fixed tube 6. Thus, while being rotated together with the zoom ring 2, the cam tube 5 is fed out together with the rectilinear tube 3 with respect to the fixed tube 6.

The rectilinear tube 3 has a circumferential groove on the inner circumference as mentioned above, and is bayonet-coupled to the rectilinear tube connecting pin MC of the cam tube 5. The rectilinear tube 3 also has a rectilinear key (protrusion) on the inner circumference, which engages the rectilinear groove provided in the fixed tube 6. Thus, when the cam tube 5 is rotated and fed out due to the rotation of the zoom ring 2, the rectilinear tube 3 moves straight with respect to the fixed tube 6.

The first unit moving tube 4 holds a first lens unit frame 4a. The first lens unit frame 4a holds the first lens unit L1. The first unit moving tube 4 is provided with a cam follower which engages a first unit cam groove M1 of the cam tube 5 shown in FIG. 4. The outer circumference of the first unit moving tube 4 is also provided with a connecting pin, which engages a rectilinear groove on the inner circumference of the rectilinear tube 3 so that the first unit moving tube 4 moves straight without rotating.

The second unit moving tube 7 holds a second lens unit frame 11. The second lens unit frame 11 holds the second lens unit L2. The second unit moving tube 7 is provided with cam followers 7a which each engage a second unit cam groove M2 of the cam tube 5. The outer circumference of the second unit moving tube 7 is further provided with rectilinear keys (protrusions) 7f, which each engage a rectilinear groove (recess) 6b of the fixed tube 6. Thus, the second unit moving tube 7 moves straight without rotating. Alternatively, the second unit moving tube 7 may be provided with rectilinear grooves, and the fixed tube 6 may be provided with rectilinear keys.

The third-fifth unit moving tube 8 is a moving tube that is disposed on the outer circumference of the motor moving tube 9 and is movable in the optical axis direction. An aperture unit 20 is attached to the front end of the third-fifth unit moving tube 8. The third-fifth unit moving tube 8 will be described in detail later.

The motor moving tube 9 has a focusing motor fixed thereto to drive the fourth lens unit L4. The cam follower of the motor moving tube 9 passes through an elongated hole of the third-fifth unit moving tube 8 and through the rectilinear groove of the fixed tube 6 and engages a motor cam groove MM of the cam tube 5. The motor moving tube 9 further has a rectilinear key (protrusion), which engages the rectilinear groove of the third-fifth unit moving tube 8. Thus, the motor moving tube 9 can move straight in the optical axis direction without rotating. The focusing motor engages the fourth lens unit frame 10 to drive the fourth lens unit frame 10 and the fourth lens unit L4 in the optical axis direction. Thus, the fourth lens unit frame 10 and the fourth lens unit L4 move in the optical axis direction as the focusing motor is driven and the motor moving tube 9 moves straight.

Thus, as the zoom ring 2 is rotated, the cam tube 5 is fed out while being rotated by the same angle as the angle of rotation of the zoom ring 2. As the cam tube 5 is rotated, the first lens unit L1, the second lens unit L2, the third lens unit L3, and the fifth lens unit L5 each move straight along each cam groove. The fourth lens unit L4 also moves straight as the focusing motor is driven and the cam tube 5 is rotated.

Figure 5:
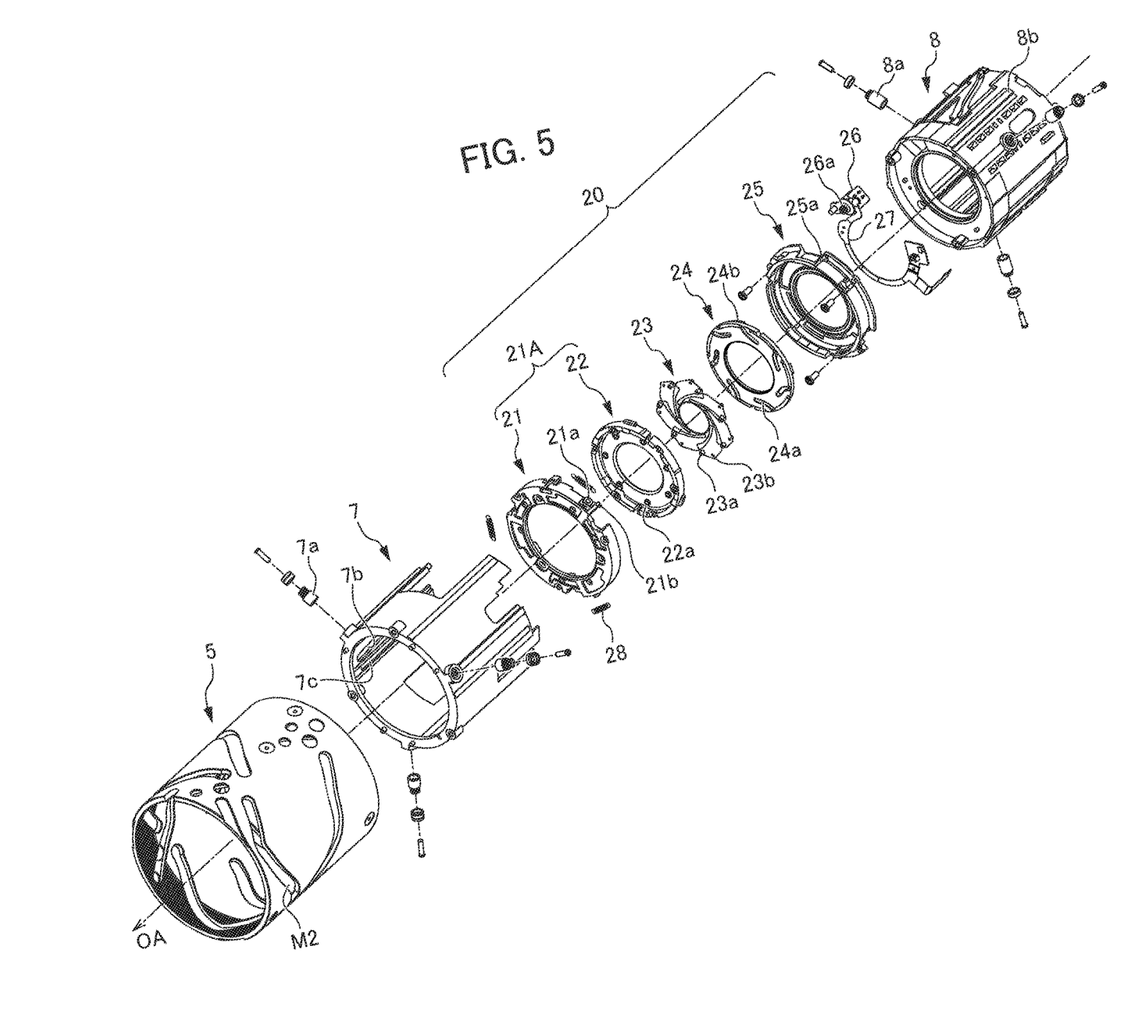
FIG. 5 is an exploded perspective view of the cam tube 5, the second unit moving tube 7, an aperture unit 20, and the third-fifth unit moving tube 8.

Next, the third-fifth unit moving tube 8, the aperture unit 20, the second unit moving tube 7, and the cam tube 5 will be described in detail. FIG. 5 is an exploded perspective view of the cam tube 5, the second unit moving tube 7, the aperture unit 20, and the third-fifth unit moving tube 8.

Third-fifth unit moving tube 8

The third-fifth unit moving tube 8 holds the third lens unit L3 on the front side and the fifth lens unit L5 on the rear side. The outer circumference of the third-fifth unit moving tube 8 is provided with three cam followers 8a at positions spaced about 120 degrees apart from each other along the same circumference. The three cam followers 8a extend toward the outer circumferential side. The three cam followers 8a each pass through the rectilinear groove 6c of the fixed tube 6 and each engage a third-fifth unit cam groove M35 shown in FIG. 4.

The outer circumferential surface of the third-fifth unit moving tube 8 is provided with three rectilinear keys (protrusions) 8b at positions spaced about 120 degrees apart from each other along the same circumference. The rectilinear keys 8b engage rectilinear grooves 7c provided on the inner surface of the second unit moving tube 7, which will be described later. Alternatively, the third-fifth unit moving tube may have rectilinear grooves, and the second unit moving tube 7 may have rectilinear keys. Thus, the third-fifth unit moving tube 8 moves straight without rotating.

Aperture Unit 20

The aperture unit 20 is fixed to the front end of the third-fifth unit moving tube 8. The aperture unit 20 includes, from the front side, an adjustment plate 21A, a plurality of diaphragm blades 23, a cam plate 24, a fixed ring 25, a stepping motor 26, and a flexible printed circuit board 27. The adjustment plate 21A, the plurality of diaphragm blades 23, the cam plate 24, and the fixed ring 25 are disposed around the optical axis OA as a center.

Adjustment Plate 21A

The adjustment plate 21A includes, from the front side, an adjustment base plate 21 and an adjustment ring 22. The adjustment base plate 21 and the adjustment ring 22 are fixed to each other with screws. Moreover, the fixing screws are slightly loosened to make possible fine adjustment of the adjustment base plate 21 in the rotation direction with respect to the adjustment ring 22. This makes it possible to adjust the accuracy of the aperture.

Adjustment Base Plate 21

The adjustment base plate 21, which is annular, has an outer circumferential surface provided with three cam followers 21a at positions spaced about 120 degrees apart from each other along the same circumference. The three cam followers 21a extend toward the outer circumferential side. The cam followers 21a each move and rotate along a cam groove 7b of the second unit moving tube 7, which will be described later.

Figure 6:
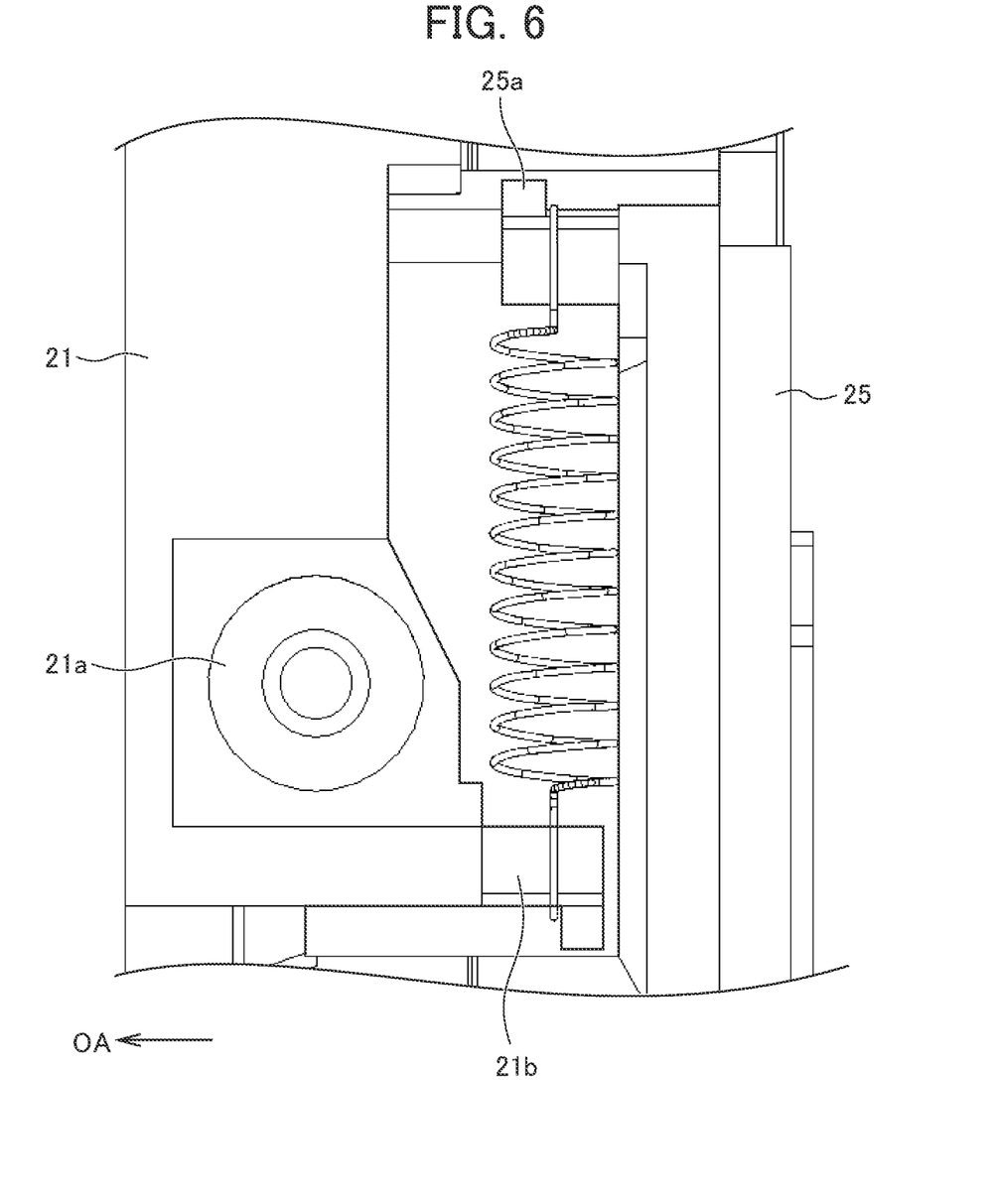
FIG. 6 is a partial side view of the aperture unit 20.

FIG. 6 is a partial side view of the aperture unit 20 in an assembled state. As shown in the drawings, spring hooks 21b extending toward the rear side are provided at three positions, which are each in the vicinity of the cam follower 21a of the adjustment base plate 21 and spaced about 120 degrees apart from each other.

Adjustment Ring 22

Referring back to FIG. 5, the adjustment ring 22, which is annular, has as many holes 22a as the diaphragm blades 23. The holes 22a each engage an adjustment pin 23a attached to the front surface of each diaphragm blade 23, which will be described later.

As the adjustment base plate 21 rotates, the adjustment ring 22 rotates to adjust the opening diameter of the aperture formed by the plurality of diaphragm blades 23.

Diaphragm Blade 23

The diaphragm blades 23 are each made of a thin sheet member and arranged to overlap in the optical axis OA direction. In an embodiment of the present invention, seven diaphragm blades 23 are provided, while the number of diaphragm blades is non-limiting. The adjustment pin 23 that engages the hole 22a of the adjustment ring 22 is attached to the front surface of each of the diaphragm blades 23. An aperture value changing pin 23b that engages a drive cam groove 24a of the cam plate 24 (described below) is provided on the rear surface of each of the diaphragm blades 23.

Cam Plate 24

The cam plate 24, which is annular, has as many drive cam grooves 24a that are provided on the front side as the diaphragm blades 23. The aperture value changing pins 23a engage the drive cam grooves 24a. The cam plate also has a gear portion 24b at its rear outer circumferential portion. A gear 26a (described later) attached to the rotary shaft of the stepping motor 26 meshes with the gear portion 24b.

Fixed Ring 25

The fixed ring 25 is annular and fixed to the third-fifth unit moving tube 8. The cam plate 24 is rotatably held by the fixed ring 25. The fixed ring 25 has spring hooks 25a at three positions spaced about 120 degrees apart from each other. As shown in FIG. 6, each spring hook 25a extends toward the front side. Energizing springs 28 are provided at three positions and each is attached between each of the spring hooks 21b of the adjustment base plate 21 and each of the spring hooks 25a of the fixed ring 25. Each energizing spring 28 energizes the spring hook 21b and the spring hook 25a in a direction in which the hooks 21b and 25a approach each other.

Stepping Motor 26

Referring back to FIG. 5, the stepping motor 26 is fixed to the fixed ring 25. The gear 26a is attached to the rotary shaft of the stepping motor 26. The gear 26a meshes with the gear portion 24b.

The flexible printed circuit board 27 extends from the stepping motor 26, and the flexible printed circuit board 27 extends to a control board (not shown).

Second Unit Moving Tube 7

The second unit moving tube 7 holds the second lens unit frame 11 and is disposed outside the aperture unit 20 and the third-fifth unit moving tube 8. The second lens unit L2 is located in front of the aperture unit 20 and the third lens unit L3.

As shown in FIGS. 2 and 3, the outer circumferential surface of the second unit moving tube 7 is provided with three cam followers 7a at positions spaced about 120 degrees apart from each other along the same circumference. The three cam followers 7a extend toward the outer circumferential side. The rectilinear key 7f extends rearward from the cam follower 7a in the optical axis direction. On the inner surface of the fixed tube 6, the rectilinear groove 6b, which engages the rectilinear key 7f, extends in the optical axis direction. The length of engagement between the rectilinear key 7f and the rectilinear groove 6b is set to a certain length in order to prevent loosening (tilting) of the second unit moving tube 7. The engagement length is determined depending on the weight of the second lens unit L2, the diameter of the second unit moving tube 7, the tube diameter of the fixed tube 6, the amount of feeding (the distance of straight moving) of the second lens unit L2, and other conditions. The cam follower 7a engages the second unit cam groove M2 of the cam tube 5 shown in FIG. 4.

As the cam tube 5 rotates, the followers 7a of the second unit moving tube 7 each move along the second unit cam groove M2 of the cam tube 5. During this time, a necessary and sufficient length of engagement is secured between the rectilinear key 7f and the rectilinear groove 6b in order to prevent loosening (tilting) of the second lens unit L2, so that the second unit moving tube 7 moves forward and rearward without being loosened with respect to the fixed tube 6.

The distance of relative movement of the second unit moving tube 7 and the third-fifth unit moving tube 8 is relatively small. For example, the distance of relative movement of the second unit moving tube 7 and the third-fifth unit moving tube 8 is smaller than the distance of relative movement of the fixed tube 6 and the third-fifth unit moving tube 8. The aperture unit 20 can be precisely controlled because the adjustment cam groove 7b (described later) is provided in the second unit moving tube 7, which moves over a relatively small distance relative to the third-fifth unit moving tube 8 (aperture unit 20).

Figure 7A:
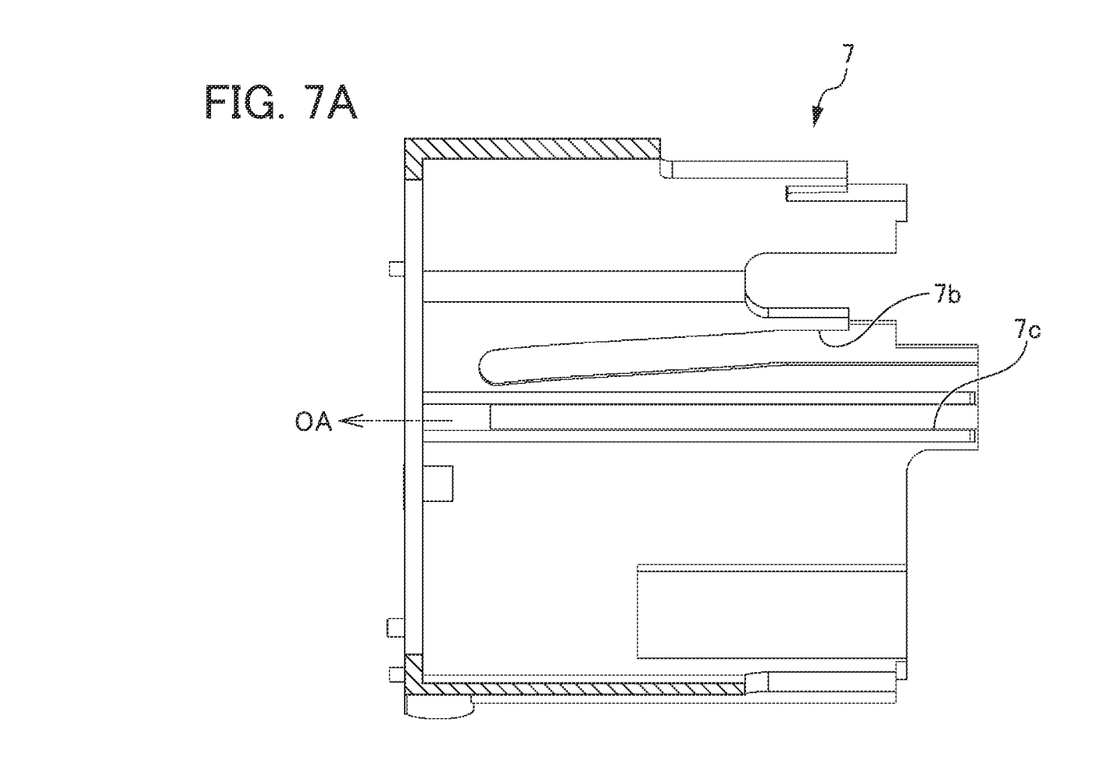
FIG. 7A is a diagram of a portion of the second unit moving tube 7 viewed from the inner surface side.
Figure 7B:
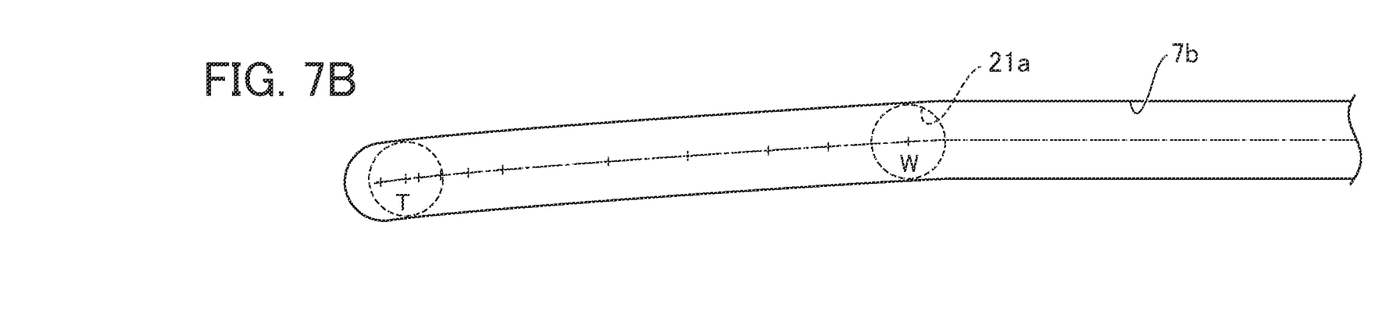
FIG. 7B is an enlarged diagram of an adjustment cam groove 7b.

FIGS. 7A and 7B are diagrams illustrating the second unit moving tube 7, in which FIG. 7A is a diagram of a portion of the second unit moving tube 7 viewed from the inner surface side, and FIG. 7B is an enlarged diagram of the adjustment cam groove 7b.

As shown in the drawings, the inner surface of the second unit moving tube 7 has adjustment cam grooves 7b at positions spaced about 120 degrees apart from each other on the same circumference, and the inner surface of the second unit moving tube 7 also has rectilinear grooves 7c at positions spaced about 120 degrees apart from each other on the same circumference. Each rectilinear groove 7c engages the rectilinear key 8b provided on the outer circumferential surface of the third-fifth unit moving tube 8, so that the second unit moving tube 7 and the third-fifth unit moving tube 8 move straight without rotating.

Each adjustment cam groove 7b has a portion not parallel to the rectilinear groove 7c, which is parallel to the optical axis OA. Specifically, the adjustment cam groove 7b includes an area inclined with respect to the rectilinear groove 7c. In other words, the distance between the rectilinear groove 7c and the adjustment cam groove 7b varies along the optical axis OA. The cam follower 21a of the adjustment base plate 21 engages the adjustment cam groove 7b of the second unit moving tube 7. No barrel member is provided between the adjustment base plate 21 (aperture unit 20) and the second unit moving tube 7. Therefore, the cam follower 21a directly engages the adjustment cam groove 7b without passing through any other member.

As the focal length of the lens barrel 1 changes between the telephoto state and the wide angle state, the position of the cam follower 21a also changes in the adjustment cam groove 7b. That is, between the wide angle state and the telephoto state, the position of the cam follower 21a changes in a circumferential direction about the optical axis as the center. In FIG. 7B, W represents the position of the cam follower 7a in the adjustment cam groove 7b when the wide angle state is reached, and T represents the position of the cam follower 7a in the adjustment cam groove 7b when the telephoto state is reached.

Cam Tube 5

The cam tube 5 is disposed outside the outer circumference of the second unit moving tube 7. The fixed tube 6 is disposed between the cam tube 5 and the second unit moving tube 7.

FIG. 4 is an exploded view of the cam tube 5. The cam tube 5 has a plurality of cam grooves. In FIG. 4, the solid lines indicate cam grooves provided on the outer surface or penetrating cam grooves, and the dotted lines indicate cam grooves provided on the inner surface.

Each cam groove engages the corresponding cam follower. In FIG. 4, the dotted circles drawn in each cam groove indicate the positions of the cam follower, in which the circled S indicates the position of the cam follower located when the lens barrel is in the contracted state, the circled W indicates the position of the cam follower located when the lens barrel is in the wide angle state, and the circled T indicates the position of the cam follower located when the lens barrel is in the telephoto state.

The first unit cam groove M1 is for the drive of the first lens unit tube 4 which holds the first lens unit L1.

An impact cam groove M1a is provided to address impact. The impact cam groove M1a engages an impact countermeasure pin (not shown) provided in the first lens unit tube 4 when the lens barrel is in a state ranging from the contracted state to the wide angle state.

The cam groove MK engages the cam follower 6a extending from the fixed tube 6. The cam groove MK is for the drive of the cam tube 5 in the optical axis direction by the rotation of the cam tube 5 with respect to the fixed tube 6.

The cam tube 5 is also provided with a zoom interlocking pin MZ, which engages the rectilinear groove provided on the inner surface of the zoom ring 2, and provided with a rectilinear tube connecting pin MC, which engages the circle groove provided on the inner surface of the rectilinear tube 3.

The motor cam groove MM is for the drive of the motor moving tube 9.

The second unit cam groove M2 is a penetrating groove for the drive of the second unit moving tube 7. The third-fifth unit cam groove M35 is for the drive of the third-fifth lens unit third-fifth unit moving tube 8.

As shown in the drawing, as the focal length of the lens barrel 1 changes from the wide angle state to the telephoto state, the distance in the optical axis direction between the cam follower 7a in the second unit cam groove M2 and the cam follower 8a in the third-fifth unit cam groove M35 decreases gradually. That is, as the wide angle state shifts to the telephoto state, the relative distance between the third-fifth unit moving tube 8 and the second unit moving tube 7 decreases constantly. Specifically, as the telephoto state shifts toward the wide angle state, the aperture unit 20 moves in a single direction (the direction in which the distance decreases) with respect to the second unit moving tube 7, so that the cam follower 21a is constantly energized against the same surface in the adjustment cam groove 7b by the energizing spring 28.

Next, the mechanism of the aperture unit 20 will be described.

Driving According to Change in Aperture Value

For example, when the photographer changes the aperture value by operation using a button or a touch panel provided on the body, a signal related to the aperture value is transmitted from the body to the control unit of the lens barrel 1. The stepping motor 26 is driven according to control signals from the control unit. When the stepping motor 26 is driven, the gear 26a is rotated, so that the gear portion 24b meshing with the gear 26a is driven to rotate the cam plate 24. As the cam plate 24 rotates, the position of the aperture value changing pin 23b engaging the drive cam groove 24a changes, so that the opening diameter of the aperture formed by the diaphragm blades 23 changes.

Driving According to Zoom Position

Figure 8:
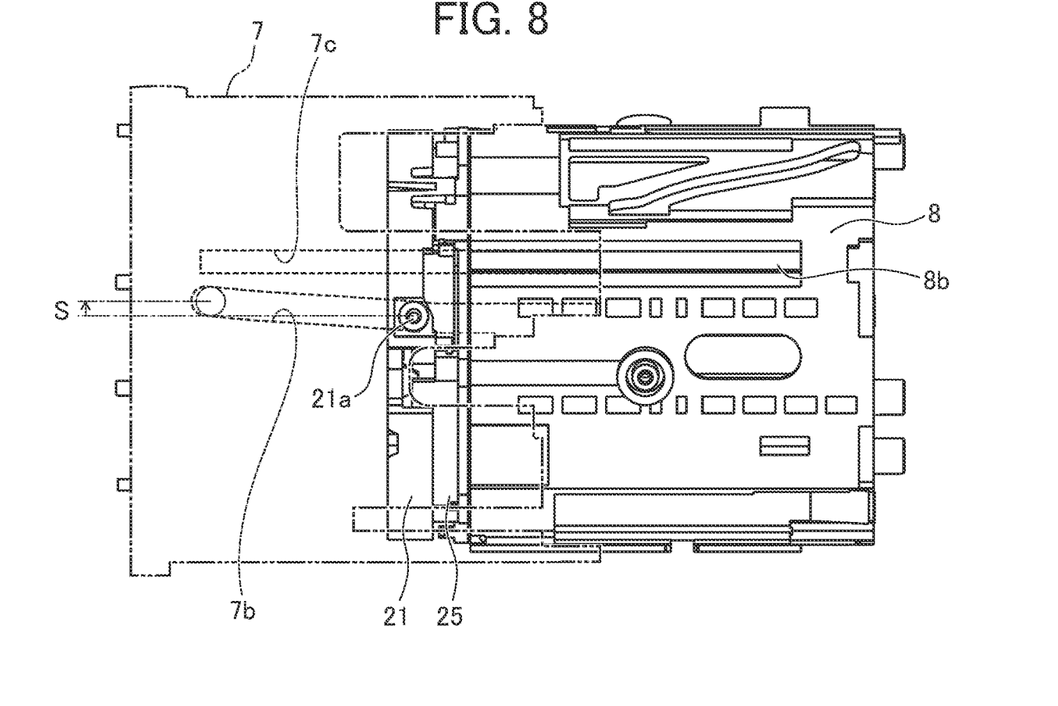
FIG. 8 is a view illustrating the positional relationship in a wide angle state between the second unit moving tube 7 and the third-fifth unit moving tube 8 and the positional relationship between a cam follower 21a and the adjustment cam groove 7b in association therewith.

The opening diameter of the aperture varies depending on the zoom position (focal length) even with the same aperture value. FIG. 8 is a view illustrating the positional relationship in the wide angle state between the second unit moving tube 7 and the third-fifth unit moving tube 8 and the positional relationship between the cam follower 21a and the adjustment cam groove 7b in association therewith.

Figure 9:
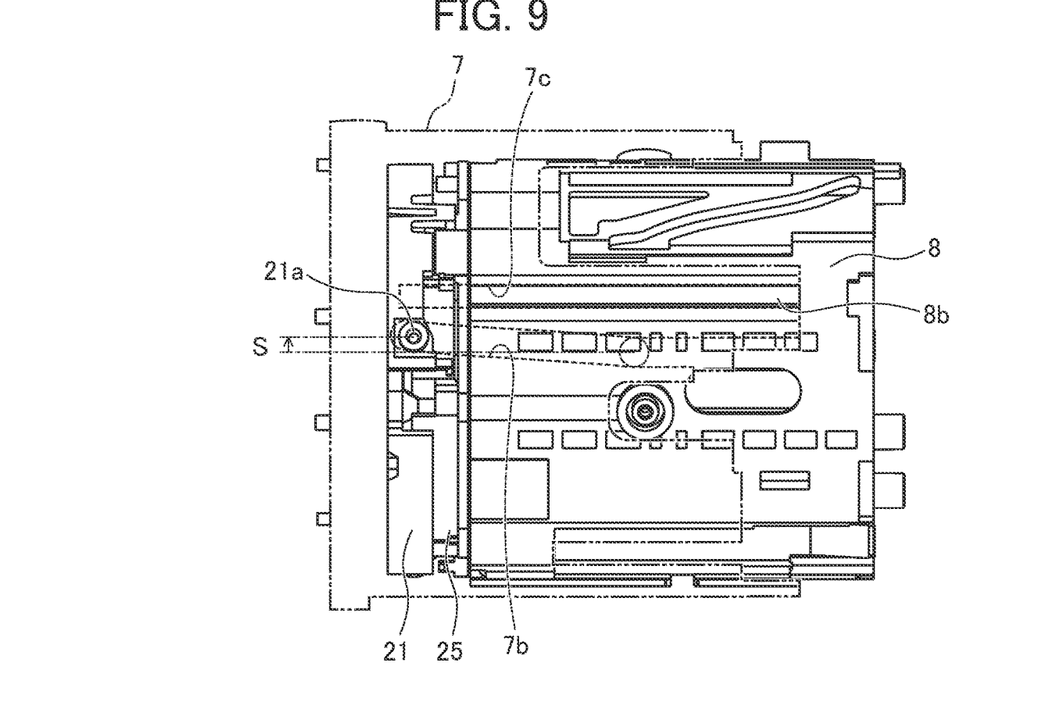
FIG. 9 is a view illustrating the positional relationship in a telephoto state between the second unit moving tube 7 and the third-fifth unit moving tube 8 and the positional relationship between the cam follower 21a and the adjustment cam groove 7b in association therewith.

FIG. 9 is a view illustrating the positional relationship in the telephoto state between the second unit moving tube 7 and the third-fifth unit moving tube 8 and the positional relationship between the cam follower 21a and the adjustment cam groove 7b in association therewith.

In FIG. 8, the cam follower 21a is located slightly rearward of the center of the adjustment cam groove 7b in the optical axis direction. As the zoom ring 2 is rotated from the state of FIG. 8 toward the telephoto state, the cam tube 5 rotates. According to this, the lens barrel holding each lens is driven in the optical axis direction, so that the zoom position (focal length) changes toward the telephoto position.

During this time, as shown in FIG. 9, the second unit moving tube 7 and the third-fifth unit moving tube 8 are driven straight in the optical axis OA direction respectively along the second unit cam groove M2 of the cam tube 5 and the third-fifth unit cam groove M35. The rectilinear groove 7c that moves along the rectilinear key 8b prevents the second unit moving tube 7 and the third-fifth unit moving tube 8 from rotating relative to each other.

As the focal length changes, the relative positional relationship (distance) in the optical axis OA direction between the second unit moving tube 7 and the third-fifth unit moving tube 8 changes, so that the position of the cam follower 21a in the adjustment cam groove 7b changes in the optical axis direction.

The adjustment cam groove 7b has a portion not parallel to the rectilinear groove 7c. Therefore, during the shift from the wide range state to the telephoto state, as the position of the cam follower 21a in the adjustment cam groove 7b changes in the optical axis direction, the cam follower 21a moves (rotates) in the direction indicated by the arrow S in FIGS. 8 and 9 about the optical axis OA as the center.

Accordingly, the adjustment base plate 21 provided with the cam follower 21a, in other words, the adjustment plate 21A, rotates about the optical axis OA with respect to the fixed ring 25, which is fixed to the third-fifth unit moving tube 8.

Figure 10:
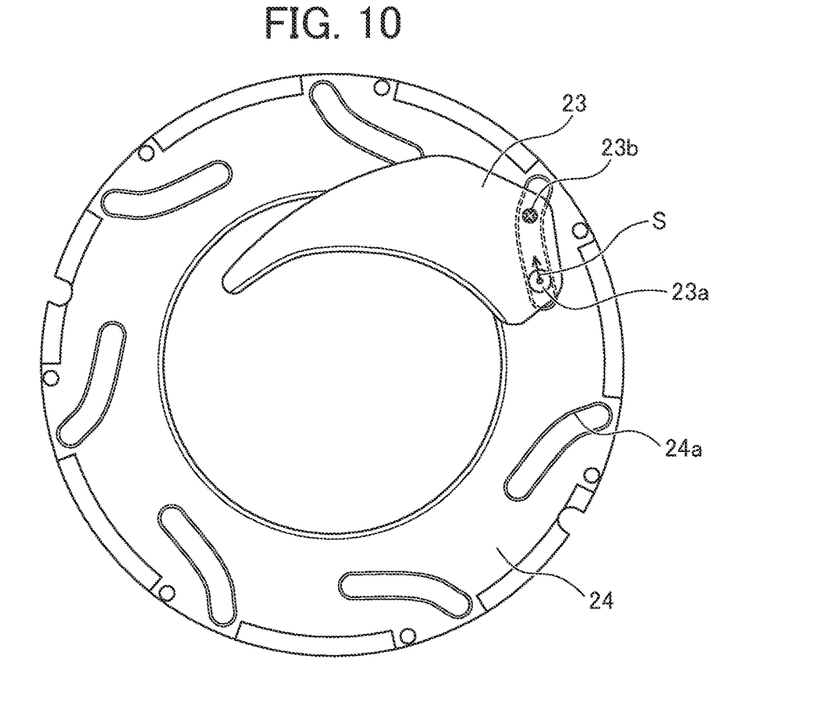
FIG. 10 is a view showing the positional relationship in a wide angle state between a cam plate 24 and diaphragm blades 23 viewed from the front side, in which only one of the diaphragm blades 23 is shown.
Figure 11:
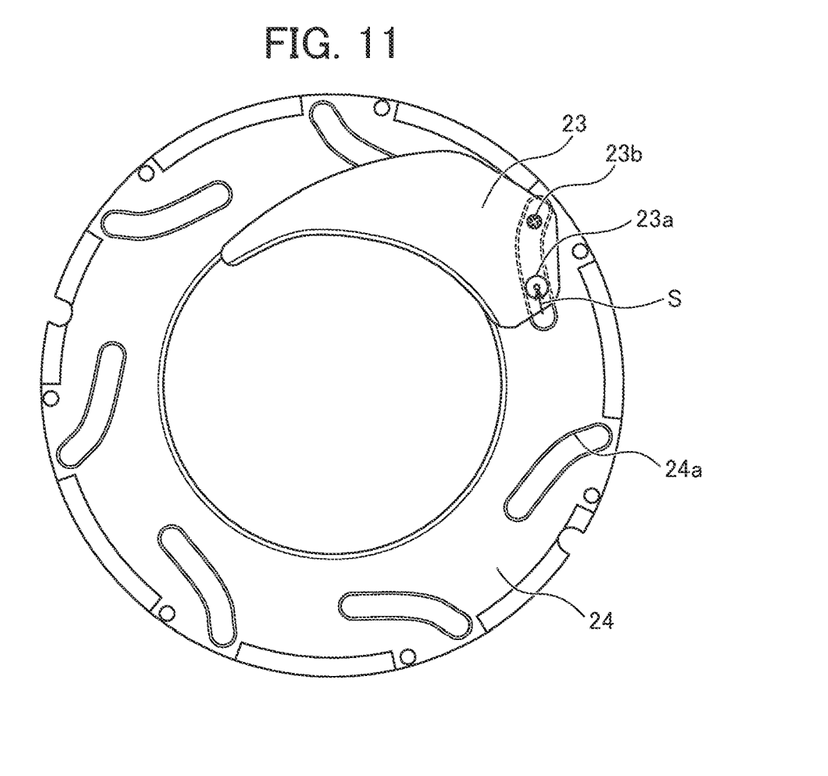
FIG. 11 is a view showing the positional relationship in a telephoto state between the cam plate 24 and the diaphragm blades 23 viewed from the front side, in which only one of the diaphragm blades 23 is shown.

FIG. 10 is a view showing the relationship in the wide angle state between the cam plate 24 and the diaphragm blades 23 viewed from the front side (object side), in which only one of the diaphragm blades 23 is shown. FIG. 11 is a view showing the positional relationship in the telephoto state between the cam plate 24 and the diaphragm blades 23 viewed from the front side, in which only one of the diaphragm blades 23 is shown.

When the state of FIG. 8 shifts to the state of FIG. 9 so that the cam follower 21a rotates counterclockwise along the circumferential direction over the distance S as viewed from the front side, the adjustment pin 23a shown in FIG. 10 also rotates counterclockwise over the distance S like the cam follower 21a.

Accordingly, as shown in FIG. 11, the aperture value changing pin 23b provided in each diaphragm blade 23 moves along the drive cam groove 24a, so that the diaphragm blades 23 are opened to increase the opening diameter of the aperture.

On the other hand, when the state of FIG. 9 shifts to the state of FIG. 8 so that the cam follower 21a rotates clockwise along the circumferential direction over the distance S as viewed from the front side, the adjustment pin 23a shown in FIG. 11 also rotates clockwise over the distance S like the cam follower 21a.

Accordingly, as shown in FIG. 10, the aperture value changing pin 23b provided in each diaphragm blade 23 moves along the drive cam groove 24a, so that the diaphragm blades 23 are closed to decrease the opening diameter of the aperture.

(1) As described above, according to the embodiment, the cam follower 21a is provided on the adjustment base plate 21 to drive the diaphragm blade 23 in the aperture unit 20. The second unit moving tube 7 is disposed on the outer circumference of the adjustment base plate 21. The inner surface of the second unit moving tube 7 is provided with the adjustment cam groove 7b for the drive for changing the opening diameter of the aperture.

The cam follower 21a engages the adjustment cam groove 7b. There is no need to form the adjustment cam groove 7b in the fixed tube 6, which makes it possible to reduce the length of the fixed tube 6 and to downsize the lens barrel 1. The cam follower 21a engages the adjustment cam groove 7b without passing through any other barrel member. In other words, the adjustment cam grooves are formed in a member immediately outside the aperture unit. Therefore, there is no need to provide any other member with any penetrating groove through which the cam follower 21*a* can pass, which results in an improvement in strength. Moreover, the structure can be made simple, and the driving efficiency can be improved.

(2) The second unit moving tube 7 is a barrel for driving the second lens unit frame 11, which holds the second lens unit L2. Such a lens-driving barrel is formed and driven with high precision such that the engagement between the rectilinear key 7*f* and the rectilinear groove 6*b* can prevent loosening and the like. Such a member formed with high precision is provided with the adjustment cam grooves 7*b* for the drive for changing the opening diameter of the aperture, which makes it possible to achieve high precision driving of diaphragms. This can also reduce any adverse effect on the optical performance.

(3) The aperture unit 20 is disposed inside the inner circumference of the second unit moving tube 7 so as to at least partially overlap with the second unit moving tube 7. Moreover, the distance of relative movement of the aperture unit 20 and the second unit moving tube 7 is relatively small. The second unit moving tube 7 having such features is provided with the adjustment cam grooves 7*b* for the drive for changing the opening diameter of the aperture, which makes possible high-precision control of the opening diameter of the aperture unit.

(4) The aperture unit 20 (third-fifth unit moving tube 8) moves in a single direction with respect to the second unit moving tube 7. In the embodiment, as the wide angle state shifts to the telephoto state, the relative distance between the third-fifth moving tube 8 and the second unit moving tube 7 decreases. Therefore, the adjustment cam groove 7*b* for changing the opening diameter of the aperture only needs to have a shape varying in a single direction, so that the adjustment cam groove 7*b* can be not complicated.

(5) The energizing spring 28 is provided between the adjustment base plate 21 (adjustment plate 21A) and the fixed ring 25 to energize the adjustment base plate 21 in a constant rotation direction about the optical axis OA against the fixed ring 25. The energizing spring 28 is attached to a portion of the adjustment base plate 21, which is in the vicinity of a portion having the cam follower 21*a*. Therefore, the energizing force is efficiently transmitted from the energizing spring 28 to the cam follower 21*a*, which makes possible reliable pressing of the cam follower 21*a* against the adjustment cam groove 7*b*.

Figures 12A, 12B:
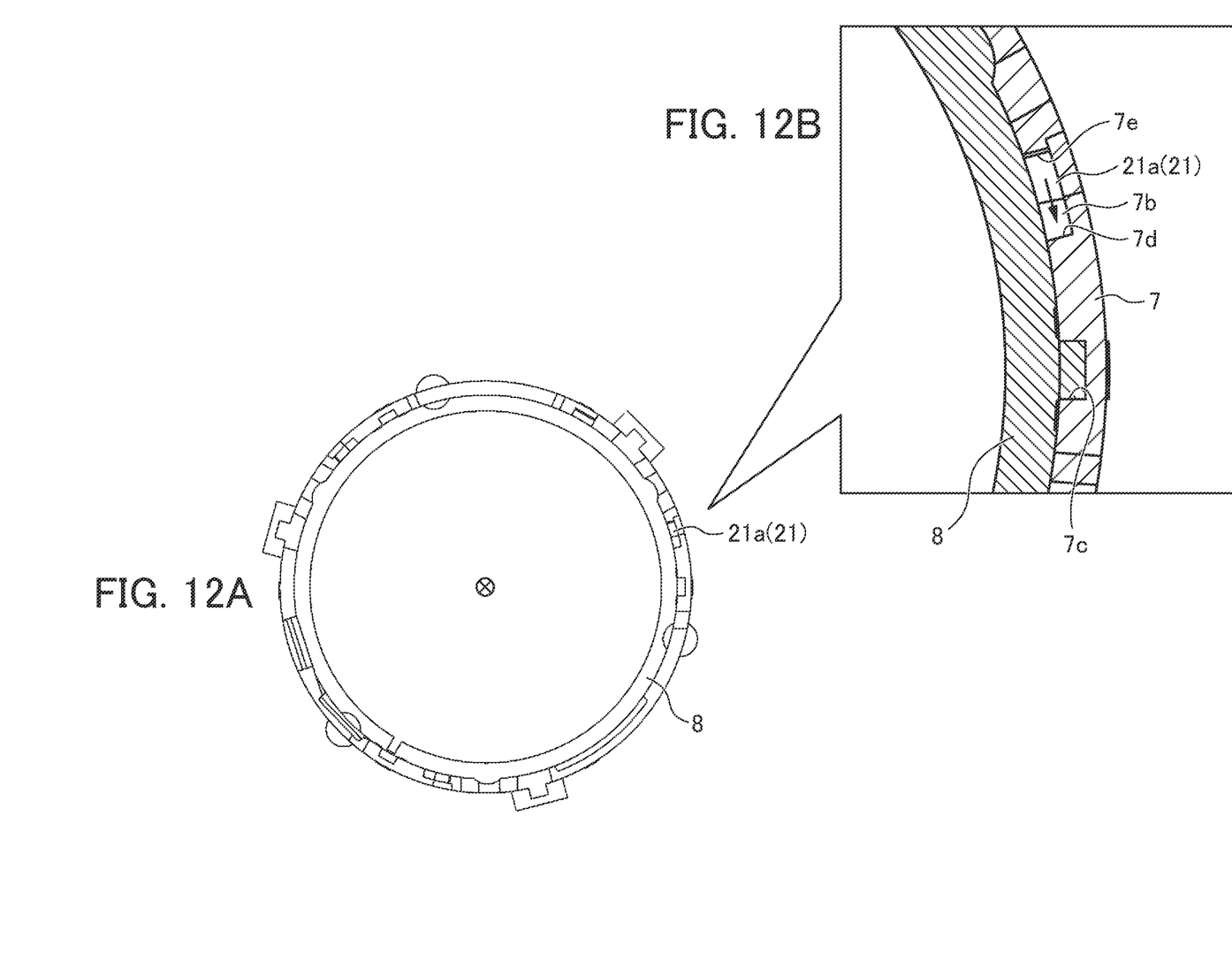
FIG. 12A is a cross-sectional view of the second unit moving tube 7.
FIG. 12B is a partially enlarged view of FIG. 12A.

(6) FIG. 12A is a cross-sectional view of the second unit moving tube 7, and FIG. 12B is a partially enlarged view of FIG. 12A. As shown in FIGS. 12A and 12B, the rectilinear groove 7*c* and the adjustment cam groove 7*b* are provided on the inner surface of the second unit moving tube 7.

When the second unit moving tube 7 is formed using a mold, the inner surface having the rectilinear groove 7*c* and the adjustment cam groove 7*b* is often formed first using a single mold.

In this case, if the mold is shaped to conform to the rectilinear groove 7*c*, it may be difficult to perform high-precision molding of both circumferential side surfaces of the adjustment cam groove 7*b* so that the precision of one of the side surfaces may be lower than that of the other side surface.

If the precision of the side surface 7*d* shown in FIGS. 12A and 12B is higher than that of the side surface 7*e*, the cam follower 21*a* will be energized in the direction of the arrow shown in the drawing by the energizing spring 28 so that the cam follower 21*a* is brought into contact with the side surface 7*d*. A slight space is formed between the cam follower 21*a* and the side surface 7*e*.

In this case, the cam follower 21*a* is driven using the side surface 7*d* of higher precision, which allows high-precision adjustment of the opening diameter of the aperture.

Moreover, since high-precision adjustment of the opening diameter of the aperture is still possible with the rectilinear groove 7*c* and the adjustment cam groove 7*b* formed using a single mold, there is no need to use different molds for the manufacture, and the lens barrel can be easily manufactured at reduced costs.

In the embodiment, three cam followers 21*a* are provided at circumferential positions in the adjustment base plate 21. However, three cam followers 21*a* are not essential, and the drive for changing the aperture diameter is possible even with a single cam follower. Moreover, when three cam followers 21*a* are provided at three positions, two of them may be smaller in size for use as backup cam followers, and only one of them may be used in contact with the cam groove.

It will be understood that all the components described above are not always necessary and any combination of the components may be used.

EXPLANATION OF REFERENCE NUMERALS

1: lens barrel, 2: zoom ring, 3: rectilinear tube, 4: first lens unit tube, 5: cam tube, 6: fixed tube, 6*a*: cam follower, 7: second unit moving tube, 7*a*: cam follower, 7*b*: adjustment cam groove, 7*c*: rectilinear groove, 8: third-fifth unit moving tube, 8*a*: cam follower, 8*b*: rectilinear key, 9: motor moving tube, 10: fourth lens unit frame, 11: second lens unit frame, 20: aperture unit, 21A: adjustment plate, 21: adjustment base plate, 21*a*: cam follower, 21*b*: spring hook, 22: adjustment ring, 22 *a*: hole, 23: diaphragm blade, 23*a*: adjustment pin, 23*b*: aperture value changing pint, 24: cam plate, 24*a*: drive cam groove, 24*b*: gear portion, 25: fixed ring, 25*a*: spring hook, 26: stepping motor, 26*a*: gear, 27: flexible printed circuit board, 28: energizing spring

The invention claimed is:

1. A lens barrel comprising:
an aperture unit having a cam follower;
a moving tube having a cam groove that engages the cam follower, the moving tube (i) being provided on an outer circumference of the aperture unit, (ii) being prevented from rotating about an optical axis of the lens barrel, and (iii) being movable in an optical axis direction; and
a fixed tube provided on an outer circumference of the moving tube so as to engage the moving tube directly, wherein
the moving tube is movable in the optical axis direction with respect to the fixed tube.

2. The lens barrel according to claim 1, wherein the aperture unit is variable in aperture diameter depending on focal length.

3. The lens barrel according to claim 1, wherein the moving tube holds a lens.

4. The lens barrel according to claim 1, wherein
the moving tube is disposed between the aperture unit and an inner circumference of the fixed tube.

5. The lens barrel according to claim 4, wherein
the fixed tube has a first engagement portion extending in the optical axis direction, and
the moving tube has a second engagement portion that engages the first engagement portion and extends in the optical axis direction.

6. The lens barrel according to claim 5, wherein the first engagement portion and the second engagement portion engage each other over a length that allows prevention of lens tilting.

7. The lens barrel according to claim 4, wherein the aperture unit and the moving tube move relative to each other over a distance smaller than a distance over which the aperture unit and the fixed tube move relative to each other.

8. The lens barrel according to claim 1, wherein the cam follower moves in the cam groove while being in contact with one wall of the cam groove and spaced apart from another wall of the cam groove.

9. The lens barrel according to claim 1, wherein the aperture unit is movable in the optical axis direction, and moves in a same direction as a direction in which the moving tube moves.

10. The lens barrel according to claim 1, wherein
the cam follower engages the cam groove without engaging other barrel members, and
the moving tube restricts rotation of the aperture unit.

11. The lens barrel according to claim 1, wherein
the fixed tube is fixed to a mount.

12. The lens barrel according to claim 1, further comprising a cam tube on an outer circumference of the fixed tube.

13. The lens barrel according to claim 12, wherein a cam follower of the moving tube engages a cam groove of the cam tube.

14. The lens barrel according to claim 1, wherein a rectilinear key on the outer circumference of the moving tube engages directly a rectilinear groove on an inner circumference of the fixed tube.

\* \* \* \* \*